United States Patent
Gou et al.

(10) Patent No.: US 12,490,270 B2
(45) Date of Patent: Dec. 2, 2025

(54) METHODS AND DEVICES FOR DETERMINING UPLINK CONTROL CHANNEL

(71) Applicant: ZTE Corporation, Shenzhen (CN)

(72) Inventors: Wei Gou, Shenzhen (CN); Junfeng Zhang, Shenzhen (CN); Peng Hao, Shenzhen (CN); Shuaihua Kou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/521,246

(22) Filed: Nov. 28, 2023

(65) Prior Publication Data

US 2024/0215031 A1 Jun. 27, 2024

Related U.S. Application Data

(63) Continuation of application No. PCT/CN2021/122044, filed on Sep. 30, 2021.

(51) Int. Cl.
*H04W 72/21* (2023.01)
*H04L 1/1867* (2023.01)
*H04W 72/11* (2023.01)

(52) U.S. Cl.
CPC .......... *H04W 72/21* (2023.01); *H04L 1/1887* (2013.01); *H04W 72/11* (2023.01)

(58) Field of Classification Search
CPC . H04W 72/21; H04W 72/11; H04W 72/0457; H04W 72/232; H04L 1/1887;

(Continued)

(56) References Cited

U.S. PATENT DOCUMENTS 12,081,340 B2 * 9/2024 Zhang .................. H04L 5/0055
2020/0205165 A1 6/2020 Huang et al.
(Continued)

FOREIGN PATENT DOCUMENTS

CN 111565093 A 8/2020
CN 112400339 A 2/2021

OTHER PUBLICATIONS

Huawei, HiSilicon "Discussion on SCell PDCCH scheduling P(S)Cell POSCH or PUSCH" 3GPP TSG RAN WGI Meeting #104-e, Jan. 25-Feb. 5, 2021, R1-2100193, 6 pages.

(Continued)

*Primary Examiner* — Kevin T Bates
(74) *Attorney, Agent, or Firm* — Perkins Coie LLP

(57) ABSTRACT

Methods and systems for techniques for determining uplink control channel slots for transmitting a feedback message in mobile communication technology are disclosed. In one example aspect, a wireless communication method includes performing a determination, by a wireless device, according to a first rule and a second rule, of one or more channel of M carriers on which to transmit a feedback message to a network device, where M is a positive integer, and transmitting, by the wireless device the feedback message according to the determination, wherein the first rule defines a transmission delay of the transmission of the feedback message, and wherein the second rule defines a switching of carriers between the M carriers in a case that M is greater than 1.

15 Claims, 8 Drawing Sheets

(58) Field of Classification Search
CPC ... H04L 1/1861; H04L 1/0026; H04L 1/0031; H04L 1/1854; H04L 5/0055; H04L 1/1812; H04L 5/006
See application file for complete search history.

(56) References Cited

U.S. PATENT DOCUMENTS

| | | | | |
|---|---|---|---|---|
| 2021/0021382 | A1* | 1/2021 | Chien | H04L 1/1861 |
| 2021/0314095 | A1* | 10/2021 | Gao | H04L 1/1614 |
| 2022/0337356 | A1* | 10/2022 | Dimou | H04L 1/1822 |
| 2023/0403717 | A1* | 12/2023 | Rastegardoost | H04W 72/232 |
| 2024/0196390 | A1* | 6/2024 | Ye | H04W 72/11 |
| 2024/0214125 | A1* | 6/2024 | Zeng | H04W 72/11 |
| 2024/0381366 | A1* | 11/2024 | Chien | H04W 72/11 |

OTHER PUBLICATIONS

ETRI "Cross-carrier scheduling from SCell to PCell" 3GPP TSG RAN WG1 #106-e, e-Meeting, Aug. 16-27, 2021, R1-2107483.

Extended European Search Report for co-pending EP Appl. No. 21958835.7, dated Dec. 16, 2024, 8 pages.

Huawei, HiSilicon, "UE feedback enhancements for HARQ-Ack" 3GPP TSG RAN WG1 Meeting #106-e, E-meeting, Aug. $16^{th}$-$27^{th}$, 2021, R1-2106490, 13 pages.

Ericsson "HARQ-ACK Enhancements for IIoT/URLLC" 3GPP TSG-RAN WG1 Meeting #106-e, Meeting, Aug. 16-27, 2021, R1-2106678, 22 pages.

International Search Report and Written Opinion for International Application No. PCT/CN2021/122044, mailed on Jun. 28, 2022 (6 pages).

Huawei et al., "UE feedback enhancements for HARQ-ACK," 3GPP TSG RAN WG1 #106-e, e-Meeting, R1-2106490, Aug. 16-27, 2021, 13 pages.

Ericsson, "HARQ-ACK Enhancements for IIoT/URLLC," 3GPP TSG RAN WG1 #106-e, e-Meeting, R1-2106678, Aug. 16-27, 2021, 21 pages.

NEC, "UE feedback enhancements for HARQ-ACK," 3GPP TSG RAN WG1 #106-e, e-Meeting, R1-2107156, Aug. 16-27, 2021, 15 pages.

* cited by examiner

Perform a determination, by a wireless device, according to a first rule and a second rule, of one or more channel of M carriers on which to transmit a feedback message to a network device, where M is a positive integer
810

Transmit, by the wireless device the feedback message according to the determination, wherein the first rule defines a transmission delay of the transmission of the feedback message, and wherein the second rule defines a switching of carriers between the M carriers in a case that M is greater than 1
820

METHODS AND DEVICES FOR
DETERMINING UPLINK CONTROL
CHANNEL

CROSS REFERENCE TO RELATED APPLICATIONS

This patent document is a continuation of and claims benefit of priority to International Patent Application No. PCT/CN2021/122044, filed on Sep. 30, 2021. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

This document relates to methods, systems, and devices for determining uplink control channel slots for transmitting a feedback message in mobile communication technology, including 5th Generation (5G), and new radio (NR) communication systems.

In one aspect, a method of data communication is disclosed. The method includes performing a determination, by a wireless device, according to a first rule and a second rule, of one or more channel of M carriers on which to transmit a feedback message to a network device, where M is a positive integer; and transmitting, by the wireless device the feedback message according to the determination, wherein the first rule defines a transmission delay of the transmission of the feedback message, and wherein the second rule defines a switching of carriers between the M carriers in a case that M is greater than 1.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWINGS

FIG. 8 shows an example of a wireless communication method based on some embodiments of the disclosed technology.

DETAILED DESCRIPTION

Figure 1:
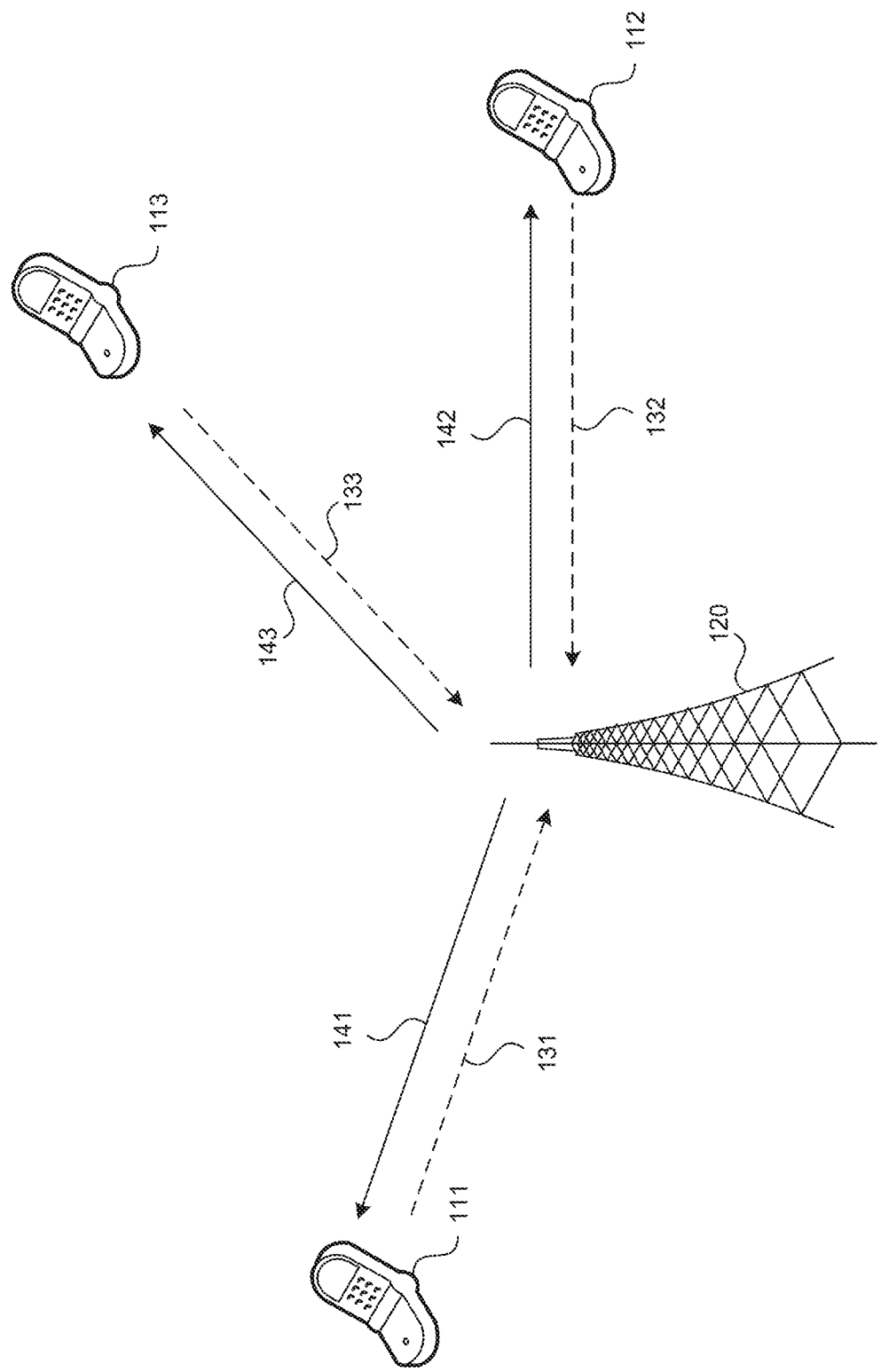
FIG. 1 shows an example of a base station (BS) and user equipment (UE) in wireless communication.

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
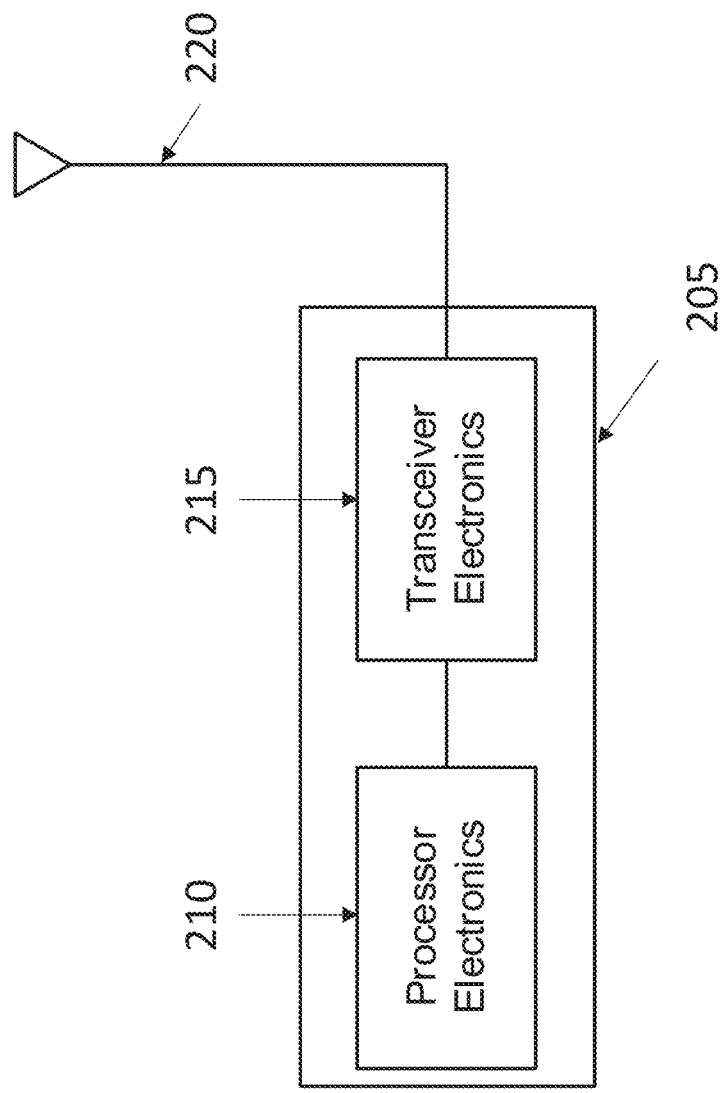
FIG. 2 is a block diagram representation of a portion of an apparatus that can be used to implement methods and/or techniques of the presently disclosed technology.

FIG. 2 is a block diagram representation of a portion of an apparatus, in accordance with some embodiments of the presently disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

The disclosed technology can be implemented in some embodiments to combine two methods for determining the PUCCH in different cases. In some implementations, the two methods include method 1 for transmitting delayed feedback for SPS HARQ-ACK PUCCH and method 2 for semi-static PUCCH carrier switching.

In some implementations, HARQ-ACK PUCCH can only be transmitted in Pcell, so method 1 is only applicable to Pcell. That is, when the transmission of the SPS HARQ-ACK PUCCH is delayed according to method 1, the target PUCCH slot and PUCCH can only be determined from the Pcell. Therefore, the disclosed technology can be implemented in some embodiments to solve the HARQ-ACK feedback problem under the SPS configuration and under the TDD configuration.

Figure 3:
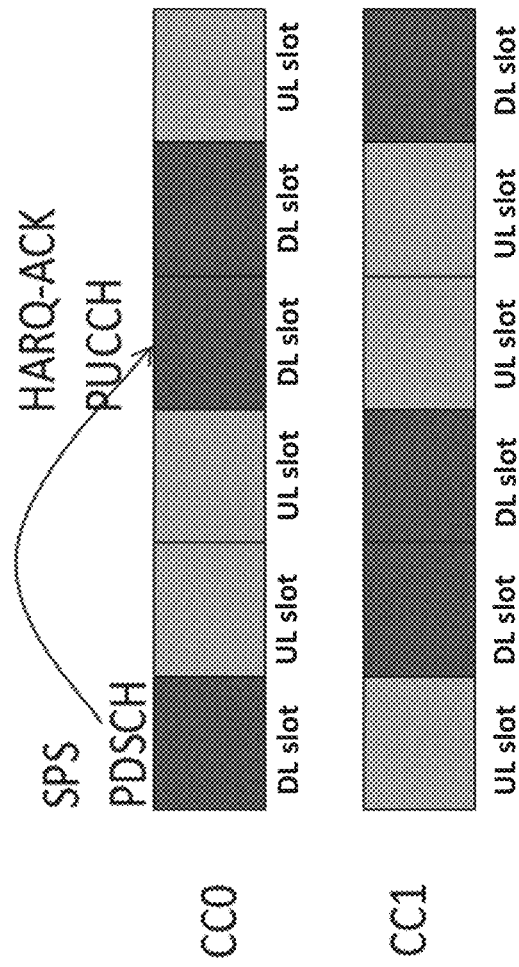
FIG. 3 shows an example method of SPS HARQ-ACK delayed feedback based on some implementations of the disclosed technology.

FIG. 3 shows an example method of SPS HARQ-ACK delayed feedback based on some implementations of the disclosed technology.

In some cases, method 1 has obvious benefits, and can obtain an earlier target PUCCH slot, thereby reducing the delay. In some cases, method 2 has a better advantage and can obtain an earlier target PUCCH slot, thereby reducing the delay. For example, as shown in FIG. 3, method 1 will bring a greater feedback delay compared to method 2.

In a case where the UE is configured with SPS HARQ-ACK delayed feedback and also configured with semi-static PUCCH carrier switching, the disclosed technology can be implemented in some embodiments to provide to UE methods for determining the target PUCCH slot and the corresponding PUCCH.

SPS HARQ-ACK PUCCH Delayed Feedback

In NR Rel-15/16, for a SPS PDSCH reception ending in slot n, the UE transmits the PUCCH in slot n+k where k is provided by the PDSCH-to-HARQ_feedback timing indicator field in DCI format 1_0 or, if present, in DCI format 1_1/1_2 activating the SPS PDSCH reception. If the UE detects a DCI format 1_1/1_2 that does not include a PDSCH-to-HARQ_feedback timing indicator field, k is provided by dl-DataToUL-ACK.

However, if slot n+k is not an uplink slot, the UE will not transmit the PUCCH with HARQ-ACK codebook. This is not an issue when the SPS periodicity is no less than 10 ms, because the network can always make sure the slot n+k is an uplink slot by implementation. However, it will be very difficult to guarantee the slot n+k is an uplink slot when SPS periodicity is one slot. For instance, a TDD configuration with a periodicity of 'DDDDU,' where 'D' indicates a downlink slot and 'U' indicates an uplink slot. When SPS periodicity is one slot, one fixed HARQ-ACK timing value k as Rel-15/16 is no longer feasible to determine a proper UL slot for transmission of HARQ-ACK associated with each DL SPS slot. As discussed in Rel-16, there are several options to solve the issue.

Option 1: Still indicate one k value. If the indicated n+k is a DL slot, it will defer to the first available PUCCH resource or an uplink slot configured by RRC.

Option 2: Indicate a set of k values where one k value for one SPS transmission in a time window configured by RRC.

Figure 4:
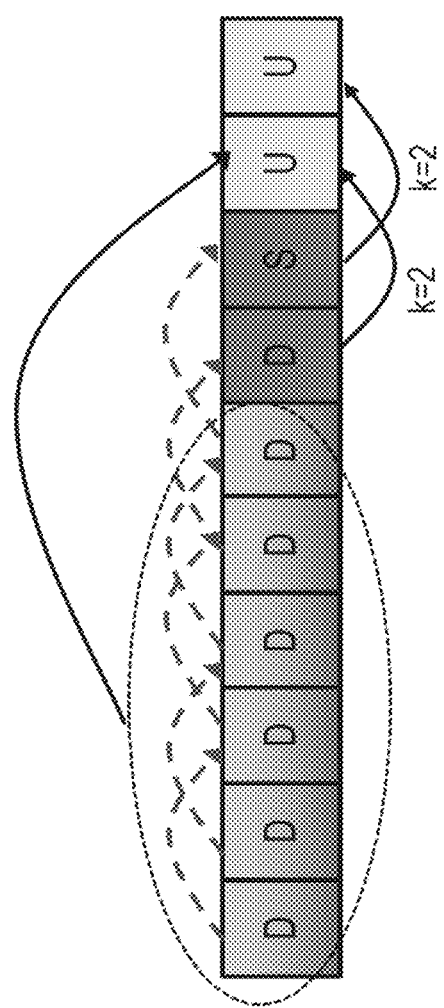
FIG. 4 shows an example of a HARQ-ACK timing indication for SPS PDSCH.

RRC configures one or more sets of k values. If more than one sets are configured, one set is chosen based on the PDSCH-to-HARQ_feedback timing indicator field in the activating DCI FIG. 4 shows an example of a HARQ-ACK timing indication for SPS PDSCH. The slots labeled with "D" indicate downlink (DL) slots and the slots labeled with "U" indicate uplink (UP) slots.

Option 1, which always delays the transmission of the feedback to the first valid PUCCH resource/slot for all SPS occasions, will incur imbalanced HARQ-ACK feedback, which is detrimental to PUCCH reliability for URLLC. As shown in FIG. 4, the HARQ-ACKs of the SPS in the first 6 DL slots are delayed to the first UL slot because k=2 indicates a DL slot for them. In this way, a total of 7 HARQ-ACKs are transmitted in the first UL slot, and one HARQ-ACK is transmitted in the second UL slot. As such, the transmission load of HARQ-ACK is severely imbalanced in the 2 UL slots.

To address the issue of SPS HARQ-ACK dropping for TDD systems, the following two options are considered:

Option 1: Deferring HARQ-ACK until a next (e.g., first) available PUCCH

FFS: Details including the definition of a next (e.g., first) available PUCCH, CB construction/multiplexing Option 2: Dynamic triggering of a one-shot/Type-3 CB type of re-transmission FFS: Details on triggering and/or CB construction (incl. potential Type-3 CB optimizations)/multiplexing Semi-Static PUCCH Carrier Switching FIG. 5 shows an example of semi-static PUCCH carrier switching.

In some implementations, if a carrier aggregation is used for UE, the HARQ-ACK PUCCH is always transmitted in the uplink primary carrier (Pcell).

Figure 5:
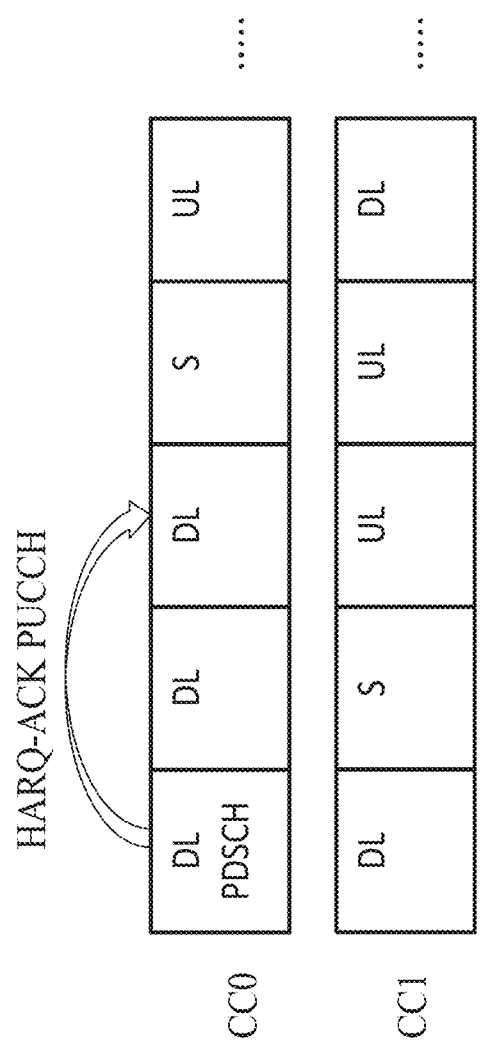
FIG. 5 shows an example of semi-static PUCCH carrier switching.

However, in some cases, for example, as shown in FIG. 5, CC0 and CC1 are aggregated, where CC0 is the primary carrier and CC1 is the secondary carrier. The slot configurations of CC0 and CC1 are shown in FIG. 5, where D indicates downlink slot, S indicates flexible slot and U indicates uplink slot. When the PDSCH in the first downlink slot of the CC0 is scheduled and required to feed back HARQ-ACK in the third slot, but the third slot is a DL slot in the CC0, HARQ-ACK PUCCH cannot be transmitted. However, the transmission of the URLLC service cannot be delayed.

Therefore, one idea is to switch the HARQ-ACK PUCCH to the CC1 for transmission, because the HARQ-ACK PUCCH corresponds to a UL slot in the CC1. This method can also be used with other PUCCHs, such as CSI PUCCH and SR PUCCH.

In addition, similar problems exist in other channels, such as a retransmitted PUSCH channel. For example, if the initial transmission of a PUSCH is scheduled in the carrier (e.g., CC0), the retransmission of the PUSCH must be scheduled via CC0. However, if the corresponding slot of the PUSCH retransmission in CC0 is a DL slot, then it should be considered that the PUSCH retransmission is performed on another carrier (that is, carrier switching is required).

Similar problems exist for PDSCH retransmission. For example, if the initial transmission of a PDSCH is scheduled in CC0, the PDSCH retransmission must be scheduled in CC0. However, if the slot configured in CC0 for retransmission of the PDSCH is a UL slot, the retransmission of the PDSCH should consider switching carrier transmission.

Therefore, the methods described in this patent document can be applied to determine the corresponding carrier for PUCCH, PUSCH or PDSCH. Furthermore, these methods also involve the determination of the number of bits for some parameter fields in the DCI in the PDCCH.

Embodiment 1

The disclosed technology can be implemented in some embodiments to combine the SPS HARQ-ACK PUCCH delayed feedback and the semi-static PUCCH carrier switching discussed above.

If the UE is configured with SPS HARQ-ACK delay and configured with semi-static PUCCH carrier switching, if the SPS HARQ-ACK is determined to perform the delayed feedback from slot n (e.g., the conditions for delayed feedback has been met in slot n), the UE determines the target PUCCH slot and PUCCH according to the following rules:

During the duration of slot n, semi-static PUCCH carrier switching is performed in order to determine the target PUCCH slot and PUCCH. If a valid PUCCH is obtained, the PUCCH is used to transmit the delayed SPS HARQ-ACK; otherwise, for the slots after slot n, the target PUCCH slot and PUCCH are determined respectively according to the SPS HARQ-ACK delay mechanism (method 1) and the semi-static PUCCH carrier switching mechanism (method 2). For PUCCHs obtained by the two methods, the earlier PUCCH is used to transmit the delayed HARQ-ACK (e.g., the earlier PUCCH is determined according to the PUCCH earlier start position or end position. If the PUCCHs have the same start position or end position, then further a PUCCH is obtained in ascending or descending order according to the index of the carriers where the PUCCHs are located. Then if PUCCHs have the same carrier index, then further a PUCCH is obtained in ascending or descending order according to the minimum (maximum) index of the resource blocks of PUCCHs). The slot where the earlier PUCCH is located is the target PUCCH slot.

If the UE determines to execute SPS HARQ-ACK deferral in slot n, the UE can perform semi-static PUCCH carrier switching to determine the target PUCCH slot and PUCCH from one or more carriers within the duration of slot n. If the target PUCCH slot and PUCCH can be determined, the UE uses the target PUCCH slot and PUCCH; otherwise, starting from slot n+1 (included), the UE performs SPS HARQ-ACK deferred and semi-static PUCCH carrier switching to determine the target PUCCH slot and PUCCH respectively, and then selects the earlier PUCCH or target PUCCH slot as the final PUCCH or final target PUCCH slot from the resulting PUCCH or target PUCCH slot.

Generally, after the target PUCCH slot is determined, the PUCCH can be determined based on the PRI in the activated DCI from the corresponding sps-PUCCH-AN-List-r16 or n1PUCCH-AN in the carrier where the target PUCCH slot is located.

Method 1: The target PUCCH slot is in the Pcell. If there is a valid SPS PUCCH configuration (corresponding sps-PUCCH-AN-List-r16 or n1PUCCH-AN is configured) in a UL slot, from the slots after slot n, the UL slot is the target PUCCH slot. From this slot, select the same PUCCH resource as the original delayed PUCCH as the final PUCCH to transmit the delayed SPS HARQ-ACKs (also the PUCCH is determined based on the PRI in the activated DCI).

Method 2: Through a defined PUCCH slot pattern period spanning multiple carriers (or spanning multiple bandwidth parts (BWP) from one carrier or multiple carriers. In the following, the carrier is taken as an example, and the same principle is applied to BWP), determine the PUCCH carrier (also determine the PUCCH slot) corresponding to the slot duration of the reference carrier in the pattern period.

Figure 6:
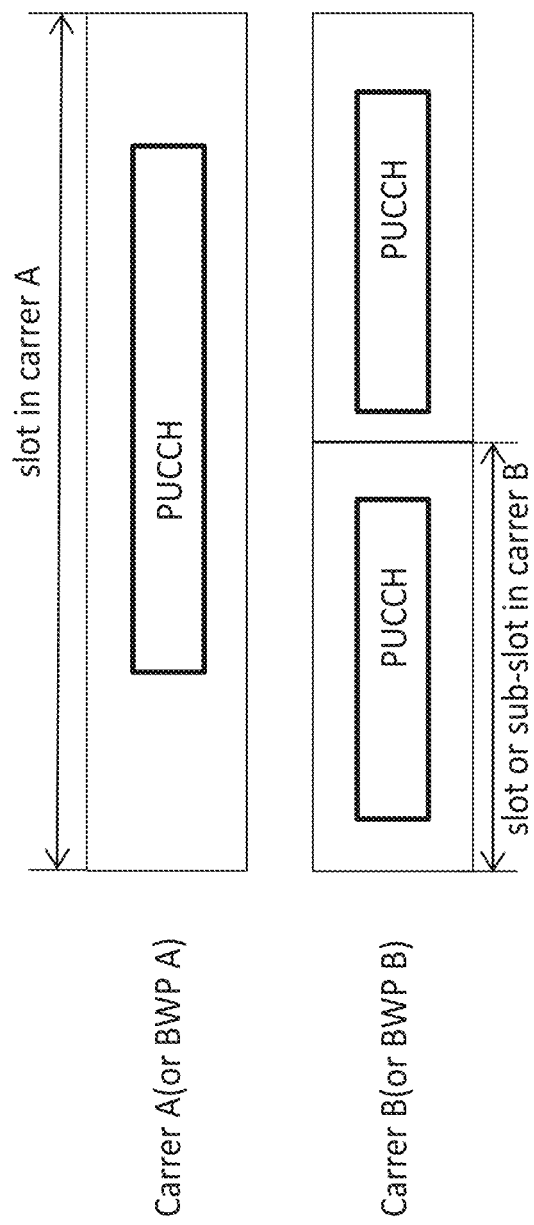
FIG. 6 shows an example situation where a PUCCH from one or more slots of a carrier overlaps in time domain with multiple non-overlapping PUCCHs from a different slot of another carrier.

FIG. 6 shows an example situation where a PUCCH from one or more slots of a carrier overlaps in time domain with multiple non-overlapping PUCCHs from a different slot of another carrier.

In another implementation, for method 2 (note that this implementation can be supported by dynamic PUCCH carrier switching or semi-static PUCCH carrier switching) in order to support the case in FIG. 6: A PUCCH from one or more slots of a carrier A overlaps in time domain with multiple non-overlapping PUCCHs from a different slot of another carrier B. Carrier A and Carrier B are configured to allow PUCCH carrier switching for the UE. Carrier A may be PCell, and carrier B may be SCell. For this case, when determining the target PUCCH slot (or PUCCH carrier) or PUCCH based on PUCCH carrier switching, the disclosed technology can be used in some embodiments to implement the following principles.

For the case shown in FIG. 6, for method 2, UE expects that, for supporting dynamic/semi-static PUCCH carrier switching. (after the PUCCH carrier is determined based on PUCCH carrier switching from multiple carriers that are allowed to switch PUCCH), only one carrier from the multiple carriers is survived as a PUCCH carrier for UCI (e.g., SR, CSI or HARQ-ACK PUCCH) at any time. In some implementations, in FIG. 6, if the slot in carrier A and 2 slots in carrier B are UL slots, then the PUCCH carrier can be determined according to one of the following cases.

1) Carrier A is determined (or configured by dynamic or semi-static signaling) as PUCCH carrier based on PUCCH carrier switching, but Carrier B is not determined as PUCCH carrier based on PUCCH carrier switching. In this way, after the PUCCH carrier is determined based on PUCCH carrier switching from multiple carriers, only the Carrier A survives as the PUCCH carrier for UCI at any time (such as during the duration of slot in carrier A).

2) Carrier B is determined as PUCCH carrier based on PUCCH carrier switching (e.g., 2 slots in carrier B are determined as PUCCH carrier based on PUCCH carrier switching), but Carrier A is not determined as PUCCH carrier based on PUCCH carrier switching. In this way, after the PUCCH carrier is determined as PUCCH carrier based on PUCCH carrier switching from multiple carriers, only the carrier B survives as the PUCCH carrier for UCI at any time.

3) Carrier A is determined as PUCCH carrier based on PUCCH carrier switching in a time, but Carrier B is not determined as PUCCH carrier based on PUCCH carrier switching in the same time. In this way, after the PUCCH carrier is determined based on PUCCH carrier switching, only the carrier A, among multiple carriers, survives as the PUCCH carrier for UCI at the duration of slot in carrier A.

4) If SR or CSI is not configured to be transmitted in Carrier A (SR/CSI is assumed to be configured on carrier A, where carrier A can be regarded as a PCell), carrier B is determined as PUCCH carrier based on PUCCH carrier switching (e.g., 2 slots in carrier B are available for PUCCH carrier), and Carrier A is not determined as PUCCH carrier based on PUCCH carrier switching. In this way, after the PUCCH carrier is determined as PUCCH carrier based on PUCCH carrier switching, only the carrier B, among multiple carriers, survives as the PUCCH carrier for UCI at the duration of slot in carrier A.

5) If SR/CSI is configured to be transmitted in carrier A in a time, carrier A is determined as PUCCH carrier based on PUCCH carrier switching. Carrier B is not determined as PUCCH carrier based on PUCCH carrier switching (e.g., 2 slots in carrier B are available for PUCCH carrier). After the PUCCH carrier is determined, Carrier A, among multiple carriers, survives as the PUCCH carrier for UCI at the duration of slot in carrier A.

In some implementations, the cases discussed below are not supported by the method 2.

1) Carrier A is determined as PUCCH carrier based on PUCCH carrier switching. Carrier B is also determined as PUCCH carrier based on PUCCH carrier switching (e.g., 2 slots in carrier B are determined as PUCCH carrier). In this way, after the PUCCH carrier is determined, both carrier A and carrier B survive as PUCCH carriers for UCI at any time. Obviously, this case does not meet the requirement that only one carrier be survived as PUCCH carrier for UCI at any time.

2) Carrier A is determined as PUCCH carrier based on PUCCH carrier switching. The first slot in carrier B is determined as a PUCCH carrier based on PUCCH carrier switching, but the second slot in carrier B is not determined as a PUCCH carrier. In this way, during the duration of the first slot in carrier B, both carrier A and carrier B survive as PUCCH carriers. During the duration of the second slot in carrier B, however, only carrier A survives as a PUCCH carrier. Since the requirement is not met during the duration of the first slot in carrier B, this case still does not satisfy that, after the PUCCH carrier is determined as PUCCH carrier based on PUCCH carrier switching from multiple carriers that are allowed to switch PUCCH, only one carrier survive as a PUCCH carrier for UCI at any time.

3) Carrier A is determined as PUCCH carrier based on PUCCH carrier switching. The second slot in carrier B is determined as PUCCH carrier based on PUCCH carrier switching, but the first slot in carrier B is not determined as a PUCCH carrier. In this way, during the duration of the first slot in carrier B, only carrier A is survived as a PUCCH carrier. During the duration of the second slot in carrier B, however, both carrier A and carrier B survive as PUCCH carriers. Since the requirement is not met during the duration of the second slot in carrier B, this case still does not satisfy that, at any time after the PUCCH carrier is determined as PUCCH carrier based on PUCCH carrier switching from multiple carriers, only one carrier survive as the PUCCH carrier for UCI at any time.

4) Carrier A is determined as PUCCH carrier based on PUCCH carrier switching. Carrier B is also determined as PUCCH carrier based on PUCCH carrier switching in the same time period, and two slots in carrier B are indicated as the PUCCH slots. In this way, after the PUCCH carrier is determined, both Carrier A and Carrier B survive as PUCCH carriers for UCI at the duration of slot in carrier A.

5) Carrier A is determined as PUCCH carrier based on PUCCH carrier switching. The first slot in carrier B is also determined as a PUCCH carrier. In this way, during the first slot in carrier B, both carrier A and carrier B survive as PUCCH carriers for UCI at the duration of slot in carrier A.

6) Carrier A is determined as PUCCH carrier based on PUCCH carrier switching. The second slot in carrier B is determined as a PUCCH carrier. In this way, during the second slot in carrier B, both carrier A and carrier B survive as PUCCH carriers for UCI at the duration of slot in carrier A.

7) If SR/CSI is configured to be transmitted in Carrier A (SR/CSI is assumed to be configured on carrier A, where carrier A can be regarded as a Pcell), carrier B is determined as the PUCCH carrier. Therefore, after the PUCCH carrier is determined, both carrier A and carrier B survive as PUCCH carriers for SR/CSI and HARQ-ACK, respectively. In this way, for method 2 in FIG. 6, even if SR/CSI PUCCH is configured in one carrier, method 2 can always maintain only one PUCCH carrier for UCI. The biggest benefit of Method 2 is that it can avoid the PUCCH overlap in FIG. 6, thereby avoiding additional designs and methods that would have been needed to address potential issues associated with the multiplexing of SR, CSI and HARQ-ACK from carrier A and carrier B, which is very complicated.

In other implementations, Method 2 may configure 2 carriers (e.g., CC0 and CC1) to support semi-static PUCCH carrier switching. CC0 is used as a Pcell or reference carrier. In CC0, during a slot duration, the corresponding PUCCH carrier, that is, the PUCCH slot, will be configured. For example, during the duration of the first slot of CC0, CC1 is configured as a PUCCH carrier through configuration signaling, that is, the PUCCH slot will be configured in CC1. During the duration of the second slot of CC0, CC0 is configured as a PUCCH carrier through signaling, that is, the PUCCH slot will be configured in CC0. According to the above method, the PUCCH carrier configuration in one pattern period can be obtained. In this way, the PUCCH carrier is determined per CC0 slot as the reference time unit from CC0 and CC1. PUCCH is determined based on (activated) PRI in DCI.

This embodiment takes SPS HARQ-ACK as an example. The method involved in this embodiment is also applicable to other HARQ-ACKs (e.g., HARQ-ACK corresponding to dynamically scheduled PDSCH, HARQ-ACK corresponding to DCI in PDCCH), and also applicable to a HARQ-ACK codebook that includes (or does not include) SPS HARQ-ACK, however, the SPS HARQ-ACK in this embodiment can be replaced with other HARQ-ACK or HARQ-ACK codebooks.

Embodiment 2

If the UE is configured with SPS HARQ-ACK delay and configured with semi-static PUCCH carrier switching, if the SPS HARQ-ACK is determined to perform the delayed feedback from slot n (e.g., the conditions for delayed feedback has been met in slot n), the UE determines the target PUCCH slot and PUCCH according to the following rules:

In an embodiment of the disclosed technology, according to semi-static PUCCH carrier switching (method 2 in Embodiment 1), UE determines the subsequent PUCCH transmission carrier and slots starting from slot n (including), and then performs the PUCCH delay feedback method (method 1 in Embodiment 1) to determine the target PUCCH slot and PUCCH from these slots.

In another embodiment of the disclosed technology, when the UE performs SPS HARQ-ACK delay feedback, the target PUCCH slot is determined from the slots determined by the semi-static PUCCH carrier switching mechanism (starting from slot n (included or not included)) in time sequence. For example, the slots are all the allowed PUCCH slots all over the carriers to be the candidate PUCCH slots for the potential PUCCH slot for deferring feedback of SPS HARQ-ACK, all the allowed PUCCH slots are determined by PUCCH carrier switching time pattern.

After the target PUCCH slot is determined, the PUCCH can be determined based on the PRI in the activated DCI from the corresponding sps-PUCCH-AN-List-r16 or n1PUCCH-AN in the carrier where the target PUCCH slot is located.

These slots may come from different carriers. These slots will not overlap each other in the time domain. This is because the semi-static PUCCH carrier switching does not allow the configuration of overlapping PUCCH slots between different carriers. In this way, these slots will appear sequentially in the time domain (regardless of whether the SCS of different carriers is the same).

For example, a semi-static PUCCH carrier switching pattern period includes 4 slots of the reference carrier, and it is assumed that there are 4 carriers (e.g., CC0-CC3) configured for PUCCH carrier switching. The reference carrier is CC0 (e.g., Pcell). The first to fourth slots of the reference carrier in the pattern period are respectively configured with the corresponding PUCCH carriers as CC1, CC2, CC3, and CC0. That is, during the duration of the first slot of the reference carrier CC0 in the pattern period, CC1 is configured as PUCCH carrier, PUCCH slot is in CC1, and it is marked as PUCCH slot1. During the duration of the second slot of reference carrier CC1, CC2 is configured as a PUCCH carrier, and the PUCCH slot is in CC2 and is denoted as PUCCH slot2. During the duration of the third slot of the reference carrier CC0, CC3 is configured as a PUCCH carrier, and the PUCCH slot is in CC3 and is denoted as PUCCH slot3. During the duration of the fourth slot of the reference carrier CC0, CC0 is the PUCCH carrier, and the PUCCH slot is in CC0, which is marked as PUCCH slot4.

In this way, when the SPS HARQ-ACK feedback is delayed, the UE determines the target PUCCH slot from the PUCCH slots 1 to 4. The determined conditions still use the SPS HARQ-ACK delay feedback method, but the slots are no longer just Pcell slots.

The PUCCH is determined from the target PUCCH slot based on the PRI in the DCI.

This embodiment takes SPS HARQ-ACK as an example. The method involved in this embodiment is also applicable to other HARQ-ACKs (for example, HARQ-ACK corresponding to dynamically scheduled PDSCH, HARQ-ACK corresponding to DCI in PDCCH), and also applicable to a HARQ-ACK codebook that includes (or does not include) SPS HARQ-ACK. However, it is necessary to replace the SPS HARQ-ACK in this embodiment with other HARQ-ACK or HARQ-ACK codebooks Embodiment 3

In some implementations of the disclosed technology, a dynamic PUCCH can be further combined with Embodiment 1 or Embodiment 2 or the combination of Embodiment 1 and Embodiment 2.

The dynamic PUCCH corresponds to a PDSCH that is scheduled by a DCI, and the DCI indicates a PUCCH resource to transmit the HARQ-ACK corresponding to the PDSCH. The PUCCH can be referred to as a dynamic PUCCH.

If the UE is configured to determine the target PUCCH slot and PUCCH to transmit SPS HARQ-ACK based on the method in Embodiment 1 or Embodiment 2 (take SPS HARQ-ACK as an example, other HARQ-ACK (except for SPS HARQ-ACK), SR or CSI can use the following method). The following methods can be considered.

Alternative Method 1

If the target PUCCH slot (hereinafter, referred to as "slot m") and PUCCH1 are determined based on Embodiment 1 or Embodiment 2 or semi-static PUCCH carrier switching (method 2 in Embodiment 1), and if a dynamic PUCCH2 is scheduled, and the PUCCH2 is not later than PUCCH1 (compare according to the start position or end position of the PUCCH. If the PUCCHs have the same start position or end position, then further a PUCCH is obtained in ascending or descending order according to the index of the carriers where the PUCCHs are located. Then if PUCCHs have the same carrier index, then further a PUCCH is obtained in ascending or descending order according to the minimum (maximum) index of the resource blocks of PUCCHs), then PUCCH2 is used to transmit the delayed HARQ-ACK. PUCCH1 is overridden by PUCCH2.

In this case, the base station needs to ensure that PUCCH2 can carry the delayed HARQ-ACK and the UCI originally carried by PUCCH2. In other words, the UE selects a PUCCH2 from a PUCCH set. Here, the PUCCH set is determined from the PUCCH sets configured by PUCCH-config for the carrier where the PUCCH2 is located based on the sum of the number of bits of the delayed HARQ-ACK and the original UCI corresponding to PUCCH2. PUCCH2 is selected from the determined PUCCH set based on the PRI in the DCI corresponding to PUCCH2.

Figure 7:
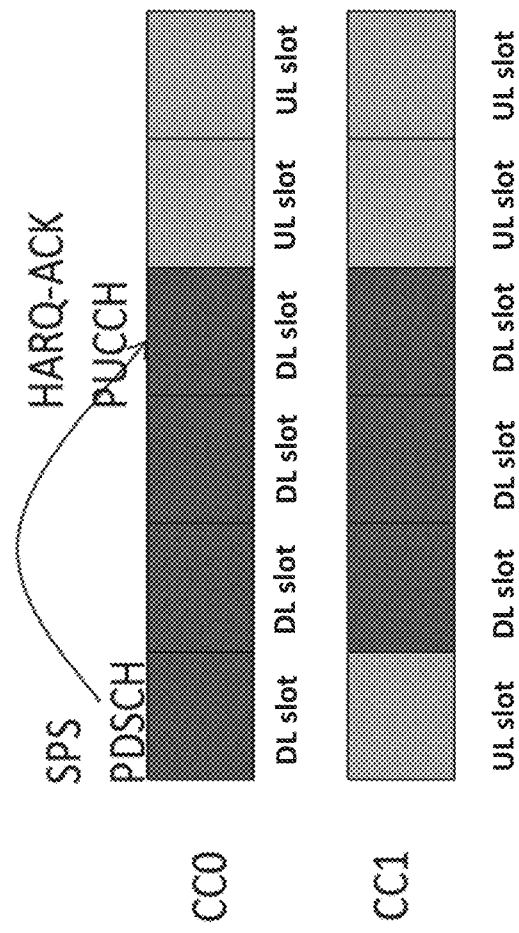
FIG. 7 shows an example method of HARQ-ACK delayed feedback transmission when a physical uplink control channel is obtained based on SPS HARQ-ACK delayed feedback method or semi-static PUCCH carrier switching method.

FIG. 7 shows an example method of HARQ-ACK delayed feedback transmission when a physical uplink control channel is obtained based on SPS HARQ-ACK delayed feedback method or semi-static PUCCH carrier switching method.

For example, if a PUCCH1 is obtained based on Embodiment 1 or Embodiment 2, in order to transmit the delayed HARQ-ACK, it is assumed that PUCCH1 is obtained in the fifth slot in CC0 in FIG. 7. If there is a dynamic PUCCH2 scheduled in the fifth slot of CC0, and the PUCCH2 is no later than PUCCH1, then PUCCH2 is used to transmit the delayed HARQ-ACK (PUCCH1 is abandoned).

If there is a dynamic PUCCH2 scheduled in the fifth slot of CC1, and the PUCCH2 is no later than PUCCH1, although PUCCH1 and PUCCH2 are from different carriers, PUCCH2 is still used to transmit the delayed HARQ-ACK.

Further, PUCCH1 and PUCCH2 here may have the same physical layer priority. Alternatively, PUCCH1 and PUCCH2 may have different physical layer priorities.

In this method, if PUCCH2 and PUCCH1 are from different carriers, and the SCS of the carriers are different, then slot m is determined according to the SCS of the carrier where PUCCH1 is located.

Alternative Method 2

In some implementations, only the same slot is considered. If the target PUCCH slot (e.g., slot m) and PUCCH1 are determined based on Embodiment 1 or Embodiment 2 or semi-static PUCCH carrier switching (method 2 in Embodiment 1), and if a dynamic PUCCH2 is scheduled in slot m, then the dynamic PUCCH2 is used to transmit the delayed HARQ-ACK. PUCCH1 is overridden by PUCCH2.

This method is applicable when PUCCH2 and PUCCH1 are from different carriers and their SCSs are different. Because PUCCH2 and PUCCH1 are different in SCS, they may not be in the same slot, but they still overlap in time domain.

In some implementations, whether PUCCH1 and PUCCH2 are from the same carrier and whether PUCCH1 and PUCCH2 are in the same slot are not considered.

In this case, the base station needs to ensure that PUCCH2 can carry the delayed HARQ-ACK and the UCI originally carried by PUCCH2. In other words, the UE selects a PUCCH2 from a PUCCH set. Here the PUCCH set is determined from the PUCCH sets configured by PUCCH-config for the carrier where the PUCCH2 is located based on the sum of the number of bits of the delayed HARQ-ACK and the original UCI corresponding to PUCCH2. PUCCH2 is selected from the determined PUCCH set based on the PRI in the DCI corresponding to PUCCH2.

In this method, if PUCCH2 and PUCCH1 are from different carriers, and the SCS of the carriers are different, then slot m is determined according to the SCS of the carrier where PUCCH1 is located.

Alternative Method 3

In some implementations, only the time domain overlap is considered. If the target PUCCH slot (e.g., slot m) and PUCCH1 are determined based on Embodiment 1 or Embodiment 2 or semi-static PUCCH carrier switching (method 2 in Embodiment 1), and if a dynamic PUCCH2 is scheduled, and if PUCCH2 and PUCCH1 overlap in time domain, then the dynamic PUCCH2 is used to transmit the delayed HARQ-ACK. The PUCCH1 is overridden by PUCCH2.

This method is applicable when PUCCH2 and PUCCH1 are from different carriers and their SCSs are different. Because PUCCH2 and PUCCH1 are different in SCS, they may not be in the same slot, but they still overlap in time domain.

In some implementations, whether PUCCH1 and PUCCH2 are from the same carrier and whether PUCCH1 and PUCCH2 are in the same slot are not considered.

In this case, the base station needs to ensure that PUCCH2 can carry the delayed HARQ-ACK and the UCI originally carried by PUCCH2. In other words, the UE selects a PUCCH2 from a PUCCH set. Here the PUCCH set is determined from the PUCCH sets configured by PUCCH-config for the carrier where the PUCCH2 is located based on the sum of the number of bits of the delayed HARQ-ACK and the original UCI corresponding to PUCCH2. PUCCH2 is selected from the determined PUCCH set based on the PRI in the DCI corresponding to PUCCH2.

Alternative Method 4

If the target PUCCH slot (e.g., slot m) and PUCCH1 are determined based on Embodiment 1 or Embodiment 2 or semi-static PUCCH carrier switching (method 2 in Embodiment 1), but if a dynamic PUCCH2 is scheduled in slot k, if slot k is not later than slot m in the time domain (compare according to the start position or end position of the slot), then the dynamic PUCCH2 is used to transmit the delayed HARQ-ACK. The PUCCH1 is overridden by PUCCH2.

In some implementations, whether PUCCH1 and PUCCH2 are from the same carrier and whether PUCCH1 and PUCCH2 are in the same slot are not considered. Here, slot k and slot m may have the same or different SCS, and may also be located on the same or different carriers. In this case, the base station needs to ensure that PUCCH2 can carry the delayed HARQ-ACK and the UCI originally carried by PUCCH2. In other words, the UE selects a PUCCH2 from a PUCCH set. Here the PUCCH set is determined from the PUCCH sets configured by PUCCH-config for the carrier where the PUCCH2 is located based on the sum of the number of bits of the delayed HARQ-ACK and the original UCI corresponding to PUCCH2. PUCCH2 is selected from the determined PUCCH set based on the PRI in the DCI corresponding to PUCCH2.

This embodiment takes SPS HARQ-ACK as an example. The method involved in this embodiment is also applicable to other HARQ-ACKs (e.g., HARQ-ACK corresponding to dynamically scheduled PDSCH, HARQ-ACK corresponding to DCI in PDCCH), and also applicable to a HARQ-ACK codebook that includes (or does not include) SPS HARQ-ACK. However, it is necessary to replace the SPS HARQ-ACK in this embodiment with other HARQ-ACK or HARQ-ACK codebooks.

Embodiment 4

If a HARQ-ACK codebook contains at least the HARQ-ACK corresponding to the SPS configuration configured with delayed feedback, when the HARQ-ACK codebook cannot be transmitted on the corresponding PUCCH/PUSCH, the HARQ-ACK codebook should be transmitted through delay feedback or PUCCH carrier switching. In addition, if the PUCCH slot and PUCCH determined for the HARQ-ACK codebook are according to the method in Embodiment 1, Embodiment 2, or Embodiment 3. The above case also includes that the PUCCH/PUSCH corresponding to UCI (uplink control information) cannot be transmitted. The UCI may be at least one of HARQ-ACK, SR or CSI.

In some implementations, the following methods can be further used:

In one example, if the final target PUCCH slot and PUCCH for the HARQ-ACK codebook are determined to be based on Method 1 in Embodiment 1, and the PUCCH or final target PUCCH slot does not exceed the range of k1+k1def, then the HARQ-ACKs configured with delayed feedback in the HARQ-ACK codebook are transmitted on this PUCCH, and other HARQ-ACKs other than the HARQ-ACK for delayed feedback in the HARQ-ACK codebook are discarded.

In another example, if the final target PUCCH slot and PUCCH for the HARQ-ACK codebook are determined based on Method 1 in Embodiment 1, and the PUCCH or final target PUCCH slot does not exceed the range of k1+k1def, HARQ-ACKs configured with delayed feedback in the HARQ-ACK codebook are transmitted on the PUCCH, and other HARQ-ACKs other than the HARQ-ACK for delayed feedback in the HARQ-ACK codebook are transmitted on a PUCCH determined to be based on Method 2 in Embodiment 1.

In another example, if the final target PUCCH slot and PUCCH for the HARQ-ACK codebook are determined to be based on the method 2 in Embodiment 1, and the PUCCH or final target PUCCH slot does not exceed the range of k1+k1def, the PUCCH transmits all HARQ-ACKs in the HARQ-ACK codebook.

In another example, if the final target PUCCH slot and PUCCH for the HARQ-ACK codebook are determined based on Embodiment 2 or Embodiment 3, and the PUCCH or final target PUCCH slot does not exceed the range of k1+k1def, the PUCCH transmits all HARQ-ACKs in the HARQ-ACK codebook.

In another example, if the final target PUCCH slot and PUCCH for the HARQ-ACK codebook are determined based on Method 1 in Embodiment 1, Method 2 in Embodiment 1, Embodiment 2 or Embodiment 3, and the PUCCH or final target PUCCH slot exceeds the range of k1+k1def, then the HARQ-ACKs that are not configured for delayed feedback in the HARQ-ACK codebook are transmitted on the PUCCH.

In another example, if the final target PUCCH slot and PUCCH for the HARQ-ACK codebook are determined based on Embodiment 2 or Embodiment 3, and the PUCCH or final target PUCCH slot exceeds the range of k1+k1def, then for the HARQ-ACK codebook, the HARQ-ACKs not configured as delayed feedback HARQ-ACKs and the HARQ-ACKs configured with delayed feedback but not beyond the corresponding range of k1+k1def are transmitted on the PUCCH.

Here, the maximum delay of SPS HARQ-ACK delay feedback is determined based on slot k1+k1def. For example, if an SPS PDSCH is transmitted in slot n and the corresponding HARQ-ACK is transmitted in slot n+k1, the latest slot of the SPS HARQ-ACK feedback delay is slot n+k1+k1def. k1def is configured to be the base station.

This embodiment takes SPS HARQ-ACK as an example. The method involved in this embodiment is also applicable to other HARQ-ACKs (for example, HARQ-ACK corresponding to dynamically scheduled PDSCH, HARQ-ACK corresponding to DCI in PDCCH), and also applicable to a HARQ-ACK codebook that includes (or does not include) SPS HARQ-ACK, and also applicable to a HARQ-ACK codebook that includes (or does not include) SPS HARQ-ACK. However, it is necessary to replace the SPS HARQ-ACK in this embodiment with other HARQ-ACK, HARQ-ACK codebooks, CSI or SR.

FIG. 8 shows an example of a wireless communication method based on some embodiments of the disclosed technology.

In some embodiments of the disclosed technology, a wireless communication method 800 includes, at 810, performing a determination, by a wireless device, according to a first rule and a second rule, of one or more channels of M carriers on which to transmit a feedback message to a network device, where M is a positive integer, and at 820, transmitting, by the wireless device the feedback message according to the determination, wherein the first rule defines a transmission delay of the transmission of the feedback message, and wherein the second rule defines a switching of carriers between the M carriers in a case that M is greater than 1. In some implementations, the first rule includes a semi-persistent scheduling of a physical uplink control channel (PUCCH). In some implementations, the second rule includes a semi-static PUCCH carrier switching. In some implementations, the one or more channels include a physical uplink control channel (PUCCH). In some implementations, the feedback message includes a hybrid automatic repeat request (HARQ) acknowledgement (ACK).

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising: performing a determination, by a wireless device, according to a first rule and a second rule, of one or more channels of M carriers on which to transmit a feedback message to a network device, where M is a positive integer; and transmitting, by the wireless device the feedback message according to the determination, wherein the first rule defines a transmission delay of the transmission of the feedback message, and wherein the second rule defines a switching of carriers between the M carriers in a case that M is greater than 1. In some implementations, the first rule includes a semi-persistent scheduling of a physical uplink control channel (PUCCH). In some implementations, the second rule includes a semi-static PUCCH carrier switching. In some implementations, the one or more channels include a physical uplink control channel (PUCCH). In some implementations, the feedback message includes a hybrid automatic repeat request (HARQ) acknowledgement (ACK).

Clause 2. The method of clause 1, wherein the switching of carriers between multiple carriers according to the second rule is performed during the transmission delay of the feedback message according to the first rule.

Clause 3. The method of clause 2, wherein, in a case that the switching of carriers between multiple carriers according to the second rule performed during the transmission delay of the feedback message is unsuccessful, the determination of the one or more channels of M carriers according to the first rule is performed in parallel with the determination of the one or more channels of M carriers according to the second rule.

Clause 4. The method of clause 3, wherein the determination of the one or more channels of M carriers includes comparing one or more channels determined according to the first rule with one or more channels determined according to the second rule to determine an earliest available channel for the transmission of the feedback message.

Clause 5. The method of clause 3, wherein the determination of the one or more channels of M carriers is performed based on a PUCCH resource indicator (PRI) in downlink control information (DCI) associated with the M carriers.

Clause 6. The method of clause 1, wherein the determination of the one or more channels of M carriers according to the first rule is performed on different channels by switching carriers according to the second rule.

Clause 7. The method of clause 6, wherein the determination of the one or more channels of M carriers includes comparing different channels determined according to the second rule to determine an earliest available channel for the transmission of the feedback message.

Clause 8. The method of clause 6, wherein the determination of one or more channels of M carriers is performed based on a PUCCH resource indicator (PRI) in downlink control information (DCI) associated with the M carriers.

Clause 9. The method of any of clauses 1-8, further comprising obtaining a dynamic physical uplink control channel (PUCCH) scheduled by a DCI.

Clause 10. The method of clause 9, wherein the determination of the one or more channels of M carriers includes: comparing the dynamic PUCCH with a non-dynamic PUCCH obtained using at least one of the first rule and the second rule; and selecting the dynamic PUCCH for the transmission of the feedback message in a case that the dynamic PUCCH is not later than the non-dynamic PUCCH.

Clause 11. The method of clause 9, wherein the determination of the one or more channels of M carriers includes selecting the dynamic PUCCH for the transmission of the feedback message based on at least one of: a sum of a number of bits of a delayed hybrid automatic repeat request (HARQ) acknowledgement (ACK) that is delayed according to the first rule and original uplink control information (UCI) corresponding to the dynamic PUCCH; or the PRI in the DCI corresponding to the dynamic PUCCH.

Clause 12. The method of clause 9, wherein the determination of the one or more channels of M carriers includes selecting a dynamic PUCCH for the transmission of the feedback message in a case that the dynamic PUCCH is in a slot where the non-dynamic PUCCH is located.

Clause 13. The method of clause 9, wherein the determination of the one or more channels of M carriers includes selecting a dynamic PUCCH for the transmission of the feedback message in a case that the dynamic PUCCH overlaps with the non-dynamic PUCCH.

Clause 14. The method of clause 9, wherein the determination of the one or more channels of M carriers includes selecting a dynamic PUCCH for the transmission of the feedback message in a case that the dynamic PUCCH is in a first slot that is not later than a second slot where the non-dynamic PUCCH is located.

Clause 15. The method of any of clauses 1-14, further comprising determining a maximum value for the transmission delay of the feedback message.

Clause 16. The method of clause 15, wherein the transmission of the feedback message is performed using a first channel determined according to the first rule upon a determination that the transmission delay of the feedback message associated with the first channel does not exceed the maximum value.

Clause 17. The method of clause 15, wherein the transmission of the feedback message is performed using a first channel determined according to the first and second rules upon a determination that the transmission delay of the feedback message associated with the first channel does not exceed the maximum value.

Clause 18. The method of clause 15, wherein the transmission of the feedback message includes transmitting all hybrid automatic repeat request (HARQ) acknowledgements (ACK) in a HARQ-ACK codebook upon a determination that the transmission delay of the feedback message associated with the first channel does not exceed the maximum value.

Clause 19. The method of clause 15, wherein the transmission of the feedback message is not performed according to the first rule upon a determination that the transmission delay of the feedback message associated with the first channel exceeds the maximum value.

Clause 20. The method of any of clauses 1-19, wherein the one or more channels include a physical uplink control channel (PUCCH).

Clause 21. The method of any of clauses 1-19, wherein the feedback message includes a hybrid automatic repeat request (HARQ) acknowledgement (ACK).

Clause 22. The method of any of clauses 1-19, wherein the first rule includes a semi-persistent scheduling of a physical uplink control channel (PUCCH).

Clause 23. The method of any of clauses 1-19, wherein the second rule includes a semi-static PUCCH carrier switching.

Clause 24. An apparatus for wireless communication comprising a processor, configured to implement a method recited in one or more of clauses 1 to 23.

Clause 25. A non-transitory computer readable program storage medium having code stored thereon, the code, when executed by a processor, causing the processor to implement a method recited in one or more of clauses 1 to 23.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:
1. A method of wireless communication, comprising:
  determining, by a wireless device, upon determination that semi-persistent scheduling (SPS) hybrid automatic repeat request acknowledgement (HARQ-ACK) delay and semi-static cell switching pattern for physical uplink control channel (PUCCH) transmission are configured and that an HARQ-ACK information for SPS physical downlink shared channel (PDSCH) satisfies a condition for delay feedback in a first slot, a target slot subsequent to the first slot and a corresponding PUCCH cell for the HARQ-ACK information based on the configured semi-static cell switching pattern for PUCCH transmission, wherein the target slot is determined from candidate slots subsequent to the first slot and from PUCCH cells corresponding to the candidate slots based on the configured cell switching pattern for PUCCH transmission, wherein the candidate slots and the PUCCH cell corresponding to the candidate slots are determined by: upon determination that M cells are configured for PUCCH cell switching and a semi-static cell switching pattern period includes N slots of a reference carrier, during each slot of the N slots, configuring a cell for PUCCH transmission from the M cells and using a slot of the configured cell as a candidate slot; and selecting, by the wireless device, an earliest candidate slot as the target slot and a corresponding PUCCH cell by determining a PUCCH resource for the HARQ-ACK information in the corresponding PUCCH cell of the earliest candidate slot, wherein, in response to other uplink control information (UCI) corresponding to a downlink control information (DCI) scheduled in the earliest candidate slot, the PUCCH resource is replaced by a dynamic PUCCH resource, wherein the dynamic PUCCH carries both the HARQ-ACK information satisfying the condition for delay feedback and the other UCI, and wherein the dynamic PUCCH is selected from a set of PUCCHs determined based on a total number of bits of the HARQ-ACK information satisfying the condition for delay feedback and the other UCI.

2. The method of claim 1, further comprising: determining a PUCCH resource from a corresponding PUCCH cell of the target slot to transfer the HARQ-ACK information in the target slot.

3. The method of claim 1, wherein a PUCCH cell in the target slot includes a PUCCH corresponding to a physical downlink shared channel (PDSCH) that is scheduled by a downlink control information (DCI) that indicates a PUCCH resource for the PUCCH to transmit a HARQ-ACK information corresponding to the PDSCH.

4. The method of claim 3, wherein, in a case that the PUCCH is scheduled, the PUCCH is used to transmit the HARQ-ACK information for the SPS PDSCH.

5. The method of claim 4, wherein a PUCCH set for the PUCCH is selected from a plurality of PUCCH sets based on: a sum of bits of the HARQ-ACK information for the SPS PDSCH and uplink control information (UCI) in the PUCCH.

6. The method of claim 5, wherein the PUCCH is selected from the selected PUCCH set based on a PUCCH resource indicator (PRI) in the DCI corresponding to the PUCCH.

7. The method of claim 5, wherein the plurality of PUCCH sets are configured by a PUCCH-config.

8. A wireless device for wireless communication comprising a processor, configured to implement a method, comprising:

determining, by the wireless device, upon determination that semi-persistent scheduling (SPS) hybrid automatic repeat request acknowledgement (HARQ-ACK) delay and semi-static cell switching pattern for physical uplink control channel (PUCCH) transmission are configured and that an HARQ-ACK information for SPS physical downlink shared channel (PDSCH) satisfies a condition for delay feedback in a first slot, a target slot subsequent to the first slot and a corresponding PUCCH cell for the HARQ-ACK information based on the configured semi-static cell switching pattern for PUCCH transmission, wherein the target slot is determined from candidate slots subsequent to the first slot and from PUCCH cells corresponding to the candidate slots based on the configured cell switching pattern for PUCCH transmission, wherein the candidate slots and the PUCCH cell corresponding to the candidate slots are determined by: upon determination that M cells are configured for PUCCH cell switching and a semi-static cell switching pattern period includes N slots of a reference carrier, during each slot of the N slots, configuring a cell for PUCCH transmission from the M cells and using a slot of the configured cell as a candidate slot; and selecting, by the wireless device, an earliest candidate slot as the target slot and a corresponding PUCCH cell by determining a PUCCH resource for the HARQ-ACK information in the corresponding PUCCH cell of the earliest candidate slot, wherein, in response to other uplink control information (UCI) corresponding to a downlink control information (DCI) scheduled in the earliest candidate slot, the PUCCH resource is replaced by a dynamic PUCCH resource, wherein the dynamic PUCCH carries both the HARQ-ACK information satisfying the condition for delay feedback and the other UCI, and wherein the dynamic PUCCH is selected from a set of PUCCHs determined based on a total number of bits of the HARQ-ACK information satisfying the condition for delay feedback and the other UCI.

9. The wireless device of claim 8, wherein the method further comprises: determining a PUCCH resource from a corresponding PUCCH cell of the target slot to transfer the HARQ-ACK information in the target slot.

10. The wireless device of claim 8, wherein a PUCCH cell in the target slot includes a PUCCH corresponding to a physical downlink shared channel (PDSCH) that is scheduled by a downlink control information (DCI) that indicates a PUCCH resource for the PUCCH to transmit a HARQ-ACK information corresponding to the PDSCH.

11. The wireless device of claim 10, wherein, in a case that the PUCCH is scheduled, the PUCCH is used to transmit the HARQ-ACK information for the SPS PDSCH.

12. The wireless device of claim 11, wherein a PUCCH set for the PUCCH is selected from a plurality of PUCCH sets based on: a sum of bits of the HARQ-ACK information for the SPS PDSCH and uplink control information (UCI) in the PUCCH.

13. The wireless device of claim 12, wherein the plurality of PUCCH sets are configured by a PUCCH-config.

14. The wireless device of claim 12, wherein the PUCCH is selected from the selected PUCCH set based on a PUCCH resource indicator (PRI) in the DCI corresponding to the PUCCH.

15. A method of wireless communication, comprising:
upon determination that semi-persistent scheduling (SPS) hybrid automatic repeat request acknowledgement (HARQ-ACK) delay and semi-static cell switching pattern for physical uplink control channel (PUCCH) transmission are configured and upon determination that an HARQ-ACK information for SPS physical downlink shared channel (PDSCH) present in a first slot satisfies a condition for the SPS HARQ-ACK delay, determining, by a base station, a slot subsequent to the first slot as a target slot for the HARQ-ACK information and a corresponding PUCCH cell corresponding to the target slot for the HARQ-ACK information based on the configured cell switching pattern for PUCCH transmission, wherein the target slot is determined from candidate slots subsequent to the first slot and from PUCCH cells corresponding to the candidate slots based on the configured cell switching pattern for PUCCH transmission, wherein the candidate slots and the PUCCH cell corresponding to the candidate slots are determined by: upon determination that M cells are configured for PUCCH cell switching and a semi-static cell switching pattern period includes N slots of a reference carrier, during each slot of the N slots, configuring a cell for PUCCH transmission from the M cells and using a slot of the configured cell as a candidate slot; and receiving, by the base station, the HARQ-ACK information using a PUCCH in the target slot and the corresponding PUCCH cell, wherein an earliest candidate slot is selected as the target slot and a corresponding PUCCH cell is selected by determining a PUCCH resource for the HARQ-ACK information in the corresponding PUCCH cell of the earliest candidate slot, wherein, in response to other uplink control information (UCI) corresponding to a downlink control information (DCI) scheduled in the earliest candidate slot, the PUCCH resource is replaced by a dynamic PUCCH resource, wherein the dynamic PUCCH carries both the HARQ-ACK information satisfying the condition for delay feedback and the other UCI, and wherein the dynamic PUCCH is selected from a set of PUCCHs determined based on a total number of bits of the HARQ-ACK information satisfying the condition for delay feedback and the other UCI.

* * * * *